United States Patent
Deo et al.

(10) Patent No.: US 7,506,128 B2
(45) Date of Patent: *Mar. 17, 2009

(54) SMART CARD WITH VOLATILE MEMORY FILE SUBSYSTEM

(75) Inventors: Vinay Deo, Redmond, WA (US); Mihai Costea, Redmond, WA (US); Mahesh Sharad Lotlikar, Redmond, WA (US); Tak Chung Lung, Kirkland, WA (US); David Milstein, Redmond, WA (US); Gilad Odinak, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 337 days.

This patent is subject to a terminal disclaimer.

(21) Appl. No.: 11/095,204

(22) Filed: Mar. 31, 2005

(65) Prior Publication Data

US 2005/0171983 A1    Aug. 4, 2005

Related U.S. Application Data

(63) Continuation of application No. 09/725,322, filed on Nov. 27, 2000, now Pat. No. 6,970,891.

(51) Int. Cl.
G06F 12/00    (2006.01)

(52) U.S. Cl. .................. 711/170; 711/115; 711/205; 711/215

(58) Field of Classification Search .............. 711/115, 711/170, 205, 221, 215
See application file for complete search history.

(56) References Cited

U.S. PATENT DOCUMENTS 5,568,634 A * 10/1996 Gordons .................. 711/170
5,802,325 A *  9/1998 Le Roux .................. 710/301
6,119,209 A *  9/2000 Bauman et al. ............. 711/162
6,421,279 B1    7/2002 Tobita et al.
6,427,140 B1    7/2002 Ginter et al.
6,480,935 B1 * 11/2002 Carper et al. .............. 711/115
6,519,594 B1    2/2003 Li (Continued)

OTHER PUBLICATIONS

Carlier et al., "The Use of a Representative Agent a Solution to Wireless Drawbacks: Applications in the Context of Smart Cards", IEEE 1997, pp. 522-526.*

(Continued)

*Primary Examiner*—Reba I Elmore
(74) *Attorney, Agent, or Firm*—Lee & Hayes, PLLC (57) ABSTRACT

An integrated circuit (IC) module allows volatile data generated by applications to be stored within volatile data files in the volatile memory. A file system tracks the location of all data files as residing in either volatile memory or nonvolatile memory and facilitates access to the volatile data files in volatile memory in a similar manner to accessing nonvolatile data files in nonvolatile memory. The file system exposes a set of application program interfaces (APIs) to allow applications to access the data files. The same APIs are used to access both volatile data files and nonvolatile data files. When an application requests access to a data file, the file system initially determines whether the application is authorized to gain access to the data file. If it is, the file system next determines whether the data file resides in volatile memory or nonvolatile memory. Once the memory region is identified, the file system identifies the physical location of the data file.

14 Claims, 4 Drawing Sheets

U.S. PATENT DOCUMENTS

| | | |
|---|---|---|
| 6,542,955 B1 | 4/2003 | Chen |
| 6,587,873 B1 | 7/2003 | Nobakht et al. |
| 6,718,319 B1 * | 4/2004 | Fisher et al. .................. 707/1 |

OTHER PUBLICATIONS

Tual et al., "MASSC: A Generic Architecture for Multiapplication Smart Cards", IEEE 1999, pp. 52-61.*

Caron et al., "New Architectures for smart cards: the OCEAN approach", IEEE 1994, pp. 148-155.*

Microsoft Press Computer Dictionary, Third Edition, 1997, pp. 148 and 149.

Lambrinoudakis, "Smart Card Technology for Deploying a Secure Information Management Framework", Information Management & Computer Security, Aug. 4, 2000, pp. 173-183.

Schnabel, "A New High-Security, Multi-Application Smart Card Jointly Developed by Bull and Phillips", Smart Card 2000, 1991 Elsevier Science Publishers B.V., pp. 9-15.

Bordat, "Micro-Computer File Protection and Encryption Systems with Smart Card Activated Hierarchical Access", Logicam, 8 pages.

Glazer, "Smart Cards", High Technology, Jul. 1996, vol. 6, No. 7, pp. 34-36, 41-43.

* cited by examiner

SMART CARD WITH VOLATILE MEMORY FILE SUBSYSTEM

RELATED APPLICATION(S)

This is a continuation of U.S. patent application Ser. No. 09/725,322, which was filed Nov. 27, 2000 and assigned to Microsoft Corporation, and is hereby incorporated by reference.

TECHNICAL FIELD

This invention relates to integrated circuit (IC) modules, such as smart cards. More particularly, this invention relates to file subsystems used in IC modules.

BACKGROUND

Integrated circuit (IC) modules, such as smart cards, are widely used in many different areas. One common use of smart cards is electronic commerce. Smart cards securely store electronic currency that may be used to purchase services or products electronically over a network or at a point-of-purchase terminal (e.g., kiosk, vending machine, phone, toll booth, etc.). Other areas in which smart cards are deployed include physical and logical access control of buildings and computer systems, storage of critical information (e.g., medical records), unscrambling of cable or satellite "premium" signals, and ticketless travel.

Smart cards have evolved technologically to include a processor and multiple forms of memory, including both volatile memory (e.g., random access memory (RAM), and nonvolatile memory (e.g., FLASH, read only memory (ROM), electrically erasable programmable read only memory EEPROM, etc.). As smart cards grew more sophisticated, they began supporting an operating system and multiple applications. One exemplary smart card operating system is Microsoft's Windows® for Smart Card operating system.

With the Windows® operating system, smart card applications can declare "volatile" variables that are stored in RAM. Today, those volatile variables are bound to the application and are disposed once the application terminates. Currently, for the Windows® for Smart Card operating system, there is no means to store and retrieve data in volatile memory for access by multiple applications. Another smart card operating system, called "MULTOS", does allow multiple applications to store and retrieve data in volatile memory, but its scheme uses a designated memory area block and associates digital certificates to share that space across applications in a controlled manner. This scheme is very complex and not simple to use or implement.

Sharing in RAM, however, poses another problem in terms of security. There is some concern that sensitive data in volatile memory might be accessed by a rogue application and used in a manner not anticipated by the smart card designer or user.

Accordingly, there is a need for technology that renders data in volatile memory available to multiple applications in a simple way, but in a secure fashion to protect against unintentional usage by rogue or malicious applications.

SUMMARY

An integrated circuit (IC) module allows volatile data generated by applications to be stored within volatile data files in the volatile memory. A file system tracks the location of all data files as residing in either volatile memory or nonvolatile memory. The file system then facilitates access to the volatile data files in volatile memory in a manner similar to accessing nonvolatile data files in nonvolatile memory.

The file system exposes a set of application program interfaces (APIs) to allow applications to access the data files. The same APIs are used to access both volatile data files and nonvolatile data files. When an application requests access to a data file, the file system initially determines whether the application is authorized to gain access to the data file. If it is, the file system next determines whether the data file resides in volatile memory or nonvolatile memory. Once the memory region is identified, the file system identifies the physical location of the data file within that memory region.

In one implementation, the file system employs a memory region directory to identify the memory region in which the data files are located (i.e., RAM, ROM, EEPROM, etc.). Once the region is identified, one or more separate file location specifiers specify the physical locations of the data files. As an example, the file system might include one file allocation table (FAT) to find data file(s) in the EEPROM and a second FAT to find data file(s) in the RAM. The second FAT is temporarily constructed and stored in RAM to specify locations of volatile data files within RAM.

In another implementation, the API functions may be modified to specify the memory region in which a data file is located. By modifying the functions, an application may pass in a parameter specifying the memory region in which the data file is currently stored.

The file system enables multiple applications to share the same data in volatile memory by accessing the volatile data files via the file system. By extending the file system to manage data in the volatile memory, the volatile data files are protected by the access control mechanisms of the file system so that only authorized applications can perform file operations on the volatile data files. As a second layer of protection, the volatile data files and RAM-based FAT are automatically destroyed when power is removed from the IC module and any reference to such files kept in the memory region directory is deleted upon initialization of the IC module when power is restored. As a result, any sensitive data that may have been stored in RAM is never available to rogue applications.

DETAILED DESCRIPTION

An integrated circuit (IC) module is designed with a file system that facilitates access to data files in nonvolatile memory and to volatile data files in volatile memory. Applications that generate volatile data on the IC module may place this volatile data in one or more data files within the volatile memory. The file system tracks the location of all data files as residing in either volatile memory or nonvolatile memory. When the same or a different application requests access to data, the file system determines whether a corresponding data file is located in volatile memory or nonvolatile memory and then locates the data file within the appropriate memory.

In this fashion, it is possible for multiple applications to share the same data in volatile memory by using the file system to access the volatile data files. By extending the file system to cover data in volatile memory, the volatile data files are protected by the access control mechanisms of the file system so that only authorized applications can perform file operations on the volatile data files.

Generally, an IC module includes some form of processing capabilities, as well as limited volatile and nonvolatile memory. IC modules typically do not have their own power supply, but instead rely on an external power source, such as power provided by a card reader. In this manner, processing tasks are accomplished only when power is applied to the IC module. In other implementations, the IC modules may be implemented as USB Keys, built-into a motherboard of a computer or even inside of a larger microprocessor or ASIC (Application Specific Integrated Circuit). For discussion purposes, the IC module is described in the context of a smart card.

Figure 1:
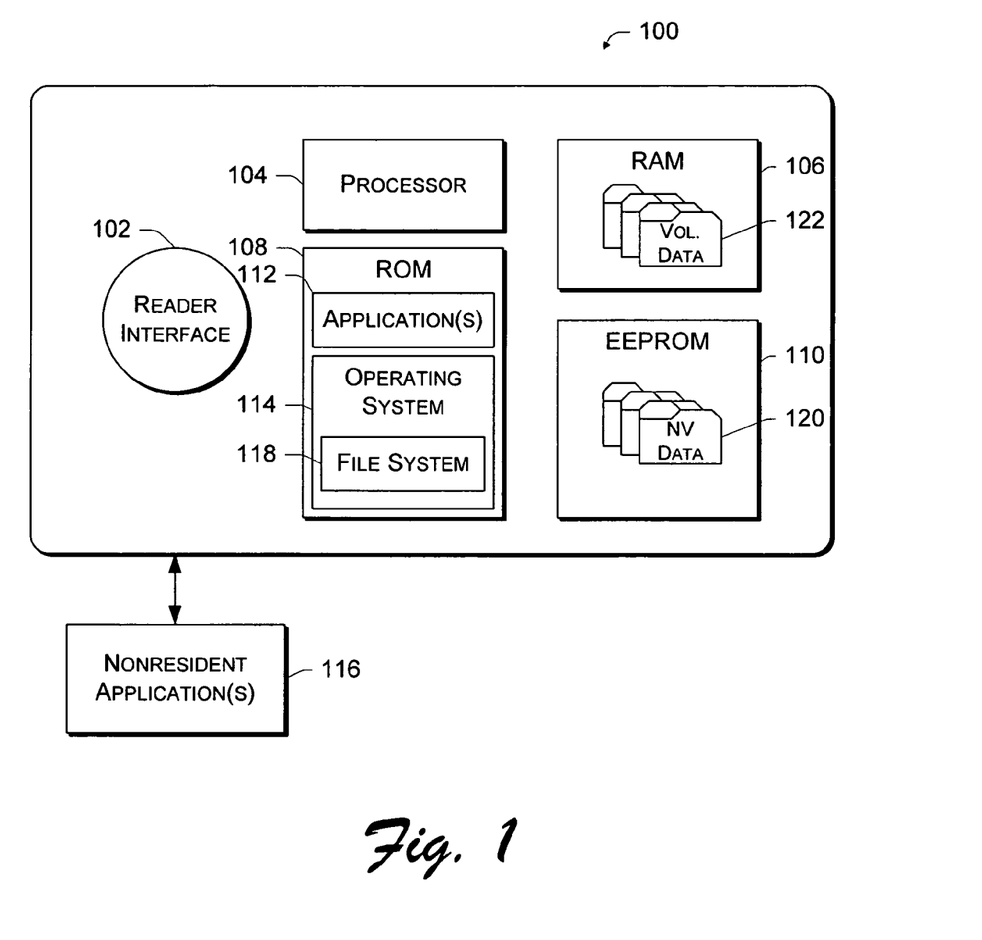
FIG. 1 is a block diagram of an integrated circuit (IC) module embodied as a smart card.

FIG. 1 shows an IC module 100 embodied as a smart card. The IC module 100 has a reader interface 102 for interfacing with a card reader, a CPU or processor 104, a volatile rewritable memory in the form of RAM (Random Access Memory) 106, a ROM (Read Only Memory) 108, and an persistent read/write memory such as EEPROM (Electrically Erasable Programmable ROM) 110. A multi-bit bus (not shown) connects the components.

One or more applications 112 and an operating system 114 are stored in ROM 108. Some applications as well as parts of the operating system can reside in EEPROM as well. When the smart card is coupled to a card reader and receives power, the application(s) 112 and operating system 114 are executed on the processor 102. The operating system 114 exposes a set of application program interfaces (APIs) that enable resident applications 112 to perform tasks and manipulate data on the smart card. In addition, one or more nonresident applications 116, which execute external to the smart card (e.g., programs on kiosks, point-of-purchase machines, etc.), may also place function calls with the operating system 114 to perform tasks or manipulate data on the smart card. Examples of such tasks include access security, cryptographic functions (e.g., encryption, decryption, signing, and verification), file management, commerce, and so forth. One suitable operating system is the "Windows for Smart Card" operating system from Microsoft Corporation.

The operating system 114 includes a file system 118 that manages files stored on the smart card. Typically, smart card files are stored in nonvolatile memory, such as nonvolatile data files 120 in EEPROM 110. However, with this system, data in volatile memory may also be stored in special files, as represented by volatile data files 122 in RAM 106. The volatile files 122 make it possible for multiple resident applications 112, as well as nonresident applications 116 that are downloaded for a particular session, to share the same data in volatile memory 106 (assuming the applications are authorized).

The file system 118 manages both the nonvolatile files 120 in EEPROM 110 as well as the volatile files 122 in RAM 106. Reading and writing of data in both the nonvolatile memory 110 and the volatile memory 106 are accomplished by accessing the file(s) using the same APIs. This encapsulates the memory management layer and makes it easier for programmers to manipulate data in volatile memory.

The file system 118 enforces two levels of security for access to the volatile files 122. As a first level, the volatile files 122 in RAM 106 are protected by access control mechanisms of the file system 118. For example, an access control list (ACL) can be associated with each file in the file system 118, including both nonvolatile files 120 and volatile files 122. The ACL controls access to the associated file, thereby permitting only authorized applications to gain access to and perform file operations on the volatile files 122. In this manner, unauthorized applications are unable to gain access to the data in the volatile files 122 of RAM 106.

As a second level of security, the volatile files 122 are destroyed when power to the smart card is terminated (e.g. removing the smart card from the card reader) or a special command is received. When power is restored, the operating system initializes the file system by deleting any data in the volatile memory (if any) and removing any reference to volatile files that may exist in nonvolatile memory.

File System for Volatile and Nonvolatile Files

Figure 2:
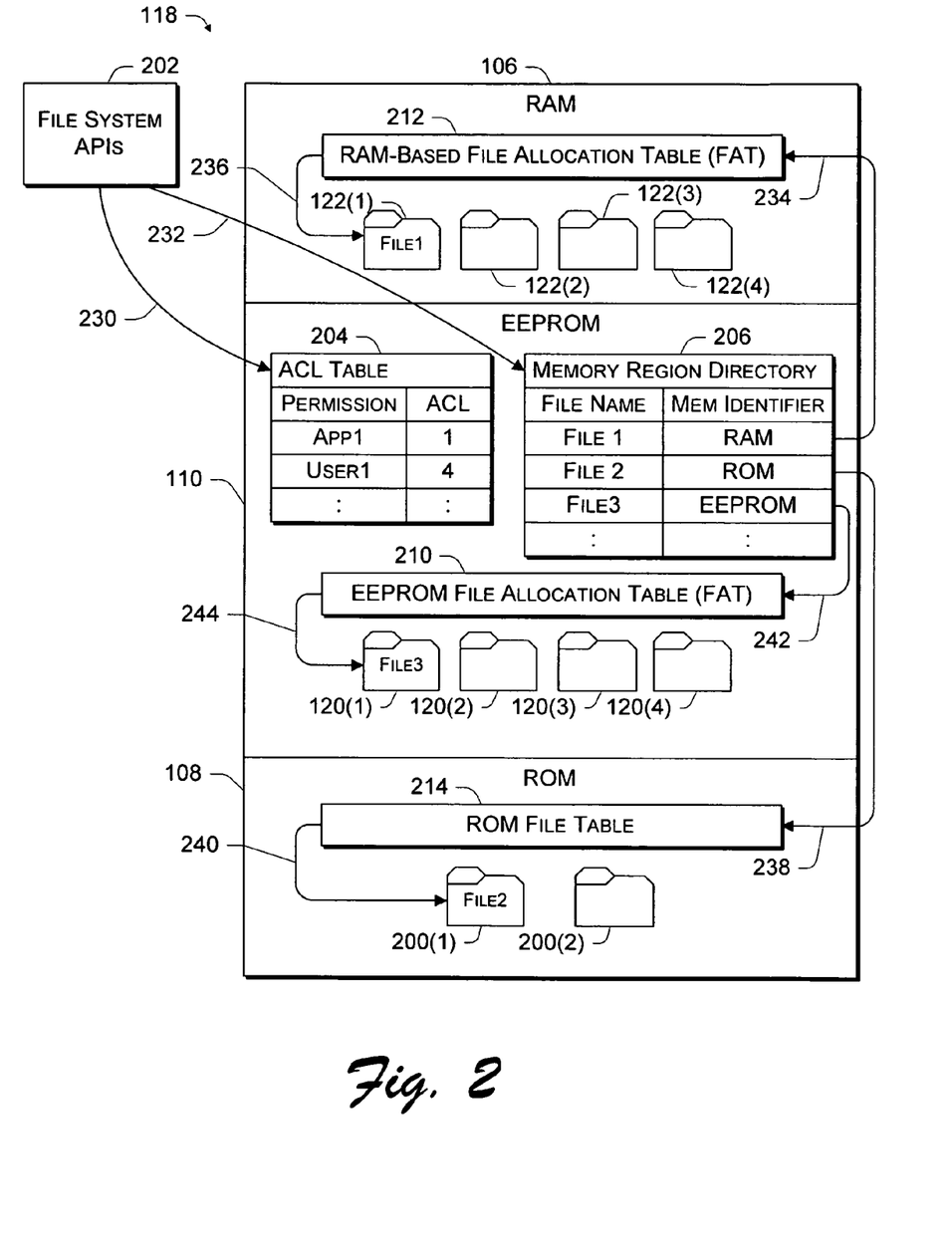
FIG. 2 is a logical representation of the file system on the IC module.

FIG. 2 illustrates a logical representation of the file system 118 implemented on IC module 100. The file system 118 manages access to both volatile and nonvolatile files in various types and regions of memory. In this example, the file system 118 facilitates access to volatile files 122(1)-122(4) in RAM 106, nonvolatile read/write files 120(1)-120(4) in EEPROM 110, and nonvolatile read-only files 200(1)-200(2) in ROM 108.

A set of file system APIs 202 allows applications to directly manipulate files and directories. Using the APIs, applications are able to create directories and files, as well as delete, close, read, and write to files. The same APIs are used for both volatile files 122 and nonvolatile files 120, 200. Thus, reading and writing of data in the volatile memory is accomplished by accessing the volatile data file(s) in RAM 106 using the same APIs used to access non-volatile read/write data files in EEPROM 110. One example set of basic APIs is provided below beneath the heading "Exemplary File System APIs". Other APIs can involve setting and getting file attributes (such as access permissions or file length), directory creation and deletion, and file deletion.

The file system 118 includes an ACL (access control list) table 204 that performs the security function of determining which users and/or applications have access to which files. The ACL table 204 might contain fields identifying what permissions have been granted to a corresponding file, the access control list that applies to the file, and the like. Access control lists and ACL tables are known in the art and are not described in detail.

The file system 118 also includes a memory region directory 206 that tracks the memory regions in which various files are located. The memory region directory 206 is illustrated in EEPROM 110 because the contents can be modified and updated as files are created, moved, or deleted. It also needs to be persistent over successive sessions, i.e. after the power is removed from the card. The memory region directory 206 includes a file name field to identify various files stored on the IC module and a memory identifier field to specify the corresponding memory region. In this example, file 1 is located in RAM 106, file 2 is located in ROM 108, and file 3 is located in EEPROM 110.

The file system 118 also includes a file location specifier to identify the physical location of the files within their relevant memory locations. In the illustrated implementation, the file system uses two different types of file location specifiers depending upon the memory region being accessed. For EEPROM 110 and RAM 106, the file system 118 employs a FAT file system, which garners its name for its method of organization—the file allocation table (FAT). Here, one file allocation table 210 resides in EEPROM 110 to locate nonvolatile read/write files 120(1)-120(4) stored in EEPROM. A second file allocation table 212 is temporarily constructed in RAM 106 to locate volatile files 122(1)-122(4) that are stored in RAM 106. With FAT file systems, the data contained in a file need not be in contiguous areas of memory.

For ROM 108, the file system 118 employs a ROM file table 214 that identifies the locations of files 200(1) and 200(2) that are fixed in memory. The ROM file table stores the size of the file and its start address in the ROM. The file data is placed in contiguous areas of the ROM. Since files in ROM 108 are permanently fixed in the read only structure, the files cannot be deleted or resized. Thus, the advantages of a FAT file system are not applicable in ROM, resulting in the use of the ROM file table.

While the file system is described in the context of FAT and fixed location tables, it is noted that other types of file systems may be used to implement the features and methods described below, such as the ROM scheme.

When power is applied to the IC module, one or more applications may create and store volatile files 122(1)-122(4) in RAM 106. The file system 118 constructs the RAM-based file allocation table 212 to track the volatile files. An entry for each volatile data file is then placed in the memory regions directory 206 to indicate that the file is located in RAM.

One or more applications may access individual volatile files 122 using the APIs 202. For instance, suppose an application would like to open a volatile file named "File1". In an implementation using Windows-brand operating system, the application calls a function named "ScwCreateFile( )", which opens an existing file or creates a new file if one does not exist. In response to this function call, the file system 118 initially visits the ACL table 204 to determine whether the application has sufficient authorization to access the requested file. This is represented by flow arrow 230 in FIG. 2.

Assuming the application is authorized, the file system 118 proceeds to the memory region directory 206 to determine which memory region holds the requested file (flow arrow 232). In this example, the directory 206 indicates that the file "File1" is located in RAM 106. The memory region directory 206 directs reference to the RAM-based file allocation table 212 (flow arrow 234), which provides physical location information to locate the volatile file 122(1) within RAM 106 (flow arrow 236).

The application may alternatively elect to open a nonvolatile file, such as "File2" or "File3". The application uses the same API function ScwCreateFile( ) as it did for the volatile file. In the case of File2, the memory region directory 206 determines that the file is located in ROM 108 and directs the file request to the ROM file table 214 (flow arrow 238). The ROM file table 214 specifies the physical location of the nonvolatile file 200(1) in ROM 108 (flow arrow 240). For File3, the memory region directory 206 directs the request to the EEPROM-based file allocation table 210 (flow arrow 242), which indicates the physical location of the nonvolatile file 120(1) in EEPROM 110 (flow arrow 244).

In this manner, the file system APIs 202 may be used to access files, regardless of where those files are located. That is, both volatile files and nonvolatile files may be accessed using the same APIs. Once the files are located, a handle to the file may be passed in to point to the exact location in memory, whether that location is in RAM, EEPROM, or ROM. The handles are obtained by creating a new file or opening an existing one, and may be passed in as a parameter of the function calls.

In a second implementation, the file system assumes that any file in a particular directory will reside in the volatile memory region. As an example, the file system understands that any file created in the "/r" directory is created in RAM. The same APIs are employed.

As a third implementation, the file system may be configured to identify the proper region of memory without using the memory region directory 206. In this implementation, the APIs are modified to include an additional parameter identifying the memory region in which the file is located. For example, the function ScwCreateFile( ) to create/open a file may be modified to include a parameter specifying whether the file is in RAM, ROM, or EEPROM, as follows:

*h*File=*Scw*CreateFile(fileName, *acl*FileName, CREATE_IN_RAM)

Once created and accessed, a file handle may be used from that point on, as follows:

*Scw*GetFileLength(*h*File)

With this third implementation, the application specifies the memory region where the file is to be created at the time of creation. This is not the case in the first implementation because the memory region directory tracks the memory region for the application.

With this architecture, volatile data kept in volatile memory is no longer bound to a single application, but can be accessed by multiple applications. Thus, one application can produce data and store that data in a volatile file in RAM 106. A second application with appropriate authorization may subsequently access the same file and use or modify the data.

By extending the file system over the volatile memory space, the volatile files are protected by the same access control mechanisms used to protect nonvolatile files. Each access request is evaluated using the access control mechanisms, such as ACL lists, to determine whether the user/application making the request is authorized to gain access to the data.

When a session is finished and power is removed from the IC module, all volatile files 122 and the RAM-based FAT table 212 are immediately destroyed. Thus, this information will not be available upon restoration of power sensitive data is not left in tact within volatile memory, preventing any improper use of the data by a rogue application when power is restored. As a further measure of protection, when power is restored, the operating system 114 initializes the file system by deleting any data left in the volatile memory and removing any references in the file system that pertain to volatile files, such as entries in the memory region directory 206.

Operation

Figure 3:
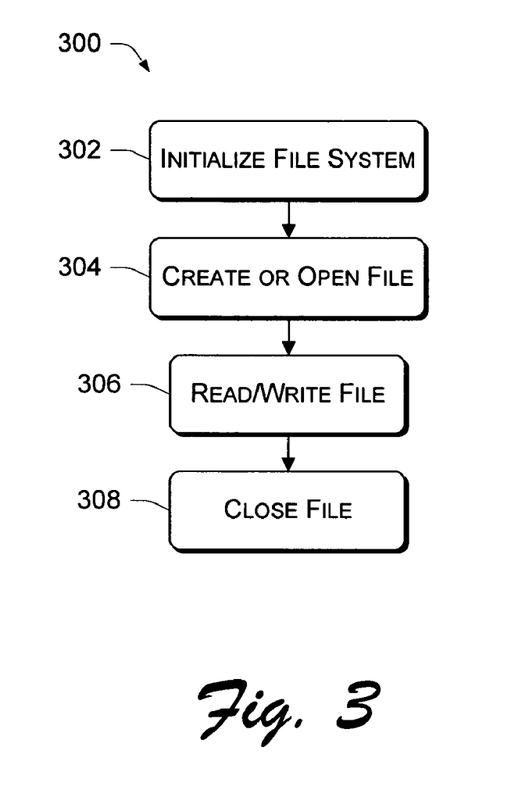
FIG. 3 is a flow diagram of a process for operating the file system of the IC module.

FIG. 3 illustrates a process 300 for operating the file system 118 of the IC module 100. At block 302, the file system 118 is initializes portions of the file system relating to the volatile memory. The file system 118 deletes any data in the volatile memory (e.g., RAM 106) and removes any entries in the memory region directory 206 pertaining to volatile files.

At block 304, in response to a request from an authorized application to create or open a file, the file system 118 creates or opens a file and obtains a handle to that file. One exemplary process of opening a file is described below in more detail below with respect to FIG. 4. If a new file is created in RAM 106, a FAT table 212 is created in RAM 106 to track the location of the volatile file and an entry is added to the memory region directory 206 in EEPROM 110.

At block 306, the application is then free to read/write data to the volatile file. When the application is finished with the volatile file, it may request that the file be closed (block 308). In response, the file system 118 deletes the file from the RAM 106 and removes entries pertaining to the file from the memory region directory 206.

Figure 4:
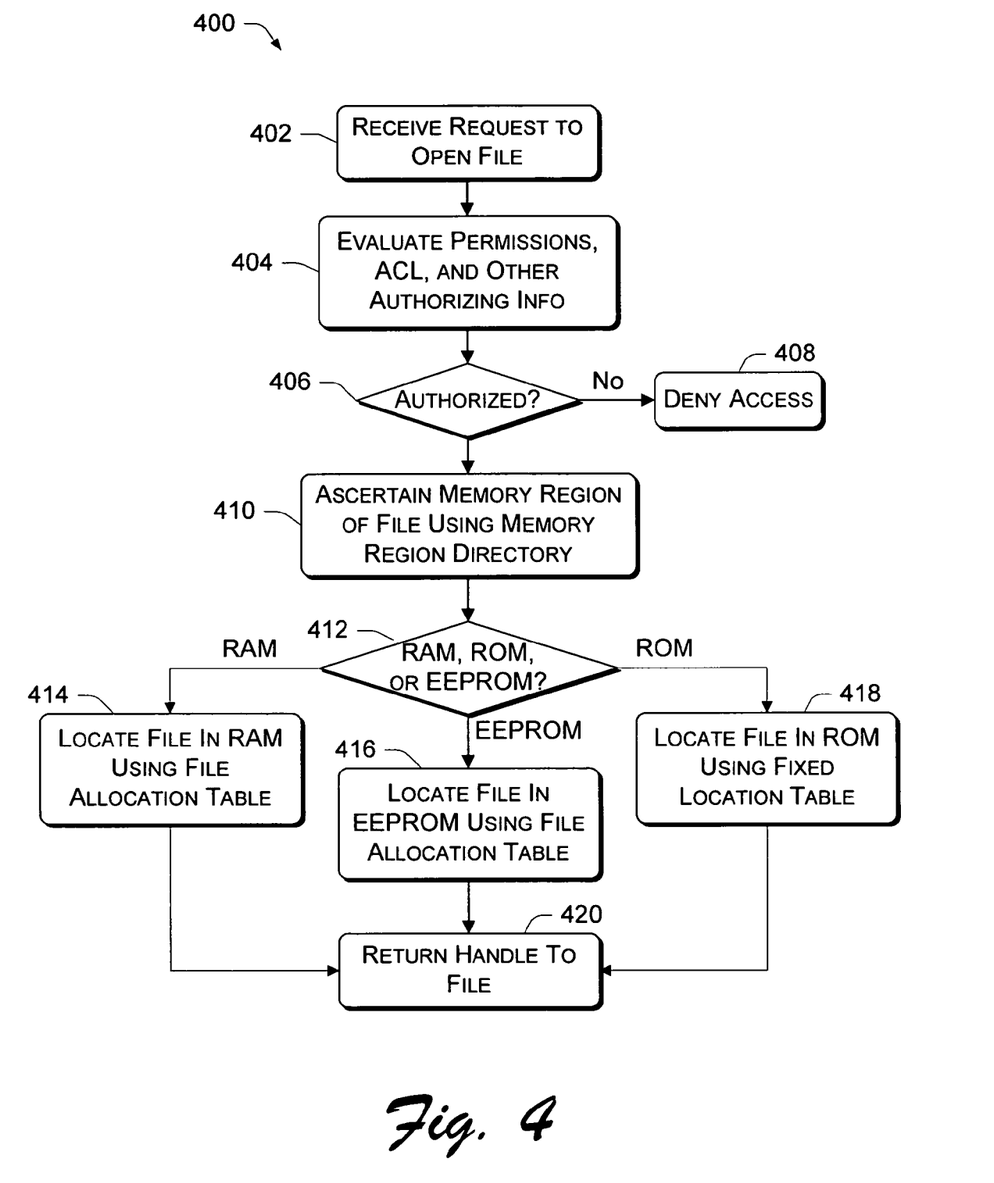
FIG. 4 is a flow diagram of a process for opening a file that might reside in volatile or nonvolatile memory.

FIG. 4 shows a process 400 for creating/opening a file on the IC module 100. At block 402, the file system receives a request from an application to open a file. At block 404, the file system 118 evaluates whether the application has appropriate authorization to access the file. As part of this validation process, the file system 118 checks the ACL table 204 for permissions and whether the application is approved by a controlling access control list.

If the application is not authorized (i.e., the "no" branch from block 406), access to the requested file is denied (block 408). On the other hand, if the application is authorized (i.e., the "yes" branch from block 406), the file system 118 determines the memory region of the file using the memory region directory 206 (block 410). For the illustrated implementation of FIG. 2, decision block 412 presents three possible memory regions: RAM 106, ROM 108, or EEPROM 110.

If the file is located in RAM 106, it is a volatile file and the file system 118 uses the RAM-based file allocation table 212 to locate the volatile file (block 414). If the file is located in EEPROM 110, it is a nonvolatile read/write file and the file system 118 uses the EEPROM-based file allocation table 210 to locate the nonvolatile read/write file (block 416). If the file is located in ROM 108, it is a nonvolatile read-only file and the file system 118 uses the ROM file table 214 to locate the nonvolatile read-only file (block 418).

Once the file is located, the file system returns a file handle for use by the requesting application (block 420). At this point, the application may perform operations on the file, such as reading and writing (except in the case of a ROM-based read-only file).

Exemplary File System APIs

The file system APIs allow a smart card application to directly manipulate files and directories, including the ability to create directories and files as well as delete, close, read, and write to files. According to one implementation, the file system architecture extends the APIs to volatile files stored in volatile memory. Table 1 lists a set of exemplary file system APIs that are supported by the Windows® for Smart Card operating system from Microsoft. These APIs are used for both volatile data files stored in volatile memory and nonvolatile data files stored in nonvolatile memory.

TABLE 1

| Functions | What it does... |
|---|---|
| ScwCreateFile | Opens an existing file or creates a new file if one does not exist. |
| ScwCreateDir | Creates a directory with the given access control list (ACL) file. |
| ScwDeleteFile | Deletes the indicated file, which could be an access control list (ACL) file or a directory. |
| ScwCloseFile | Closes the file identified by the file handle. |
| ScwReadFile | Reads the indicated number of bytes at the current offset. |
| ScwWriteFile | Writes the indicated number of bytes at the current offset. |
| ScwGetFileLength | Returns the file size. |
| ScwGetFileAttributes | Returns the file attribute value associated with the given file. |
| ScwSetFileAttributes | Sets the file attribute value associated with a given file. |
| ScwSetFilePointer | Changes the current offset of the file to the indicated offset. |
| ScwSetFileACL | Sets the access control list (ACL) file for the given file. |
| ScwGetFileACLHandle | Opens the associated access control list (ACL) file for a given file. |

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. An integrated circuit (IC) card, comprising:
a processor;
volatile memory and nonvolatile memory in the IC card operatively coupled to the processor; and
a file system to manage access to one or more data files stored in the volatile memory and in the nonvolatile memory, at least one of the one or more data files having an associated access control list to enable the file system to control application access to the at least one of the one or more data files, the file system utilizing at least a first allocation table and a second allocation table,
the first allocation table being temporary, located in the volatile memory and restricted to referencing data files stored in the volatile memory, and
the second allocation table being persistent, located in the nonvolatile memory and restricted to referencing data files stored in the nonvolatile memory.

2. An integrated circuit (IC) card as recited in claim 1, wherein the file system exposes a set of application program interfaces that are used by an application to request the one or more data files stored in the volatile memory and the nonvolatile memory.

3. An integrated circuit (IC) card as recited in claim 2, wherein individual functions defined in the set of application program interfaces include a parameter identifying whether an associated data file is stored in the volatile memory or the nonvolatile memory.

4. An integrated circuit (IC) card as recited in claim 1, wherein the file system comprises a memory region directory to identify whether the one or more data files are stored in the volatile memory or in the nonvolatile memory.

5. An integrated circuit (IC) card as recited in claim 1, wherein the file system comprises:
a memory region directory to identify whether the one or more data files are stored in the volatile memory or in the nonvolatile memory, the memory region directory to use one or more memory identifiers to specify a memory region of the one or more data files.

6. An integrated circuit (IC) card as recited in claim 5, wherein the one or more memory identifiers include RAM, EEPROM and ROM.

7. An integrated circuit (IC) card as recited in claim 1, wherein the file system utilizes a third allocation table, the third allocation table located in nonvolatile read only memory and restricted to referencing data files stored in the nonvolatile read only memory.

8. An integrated circuit (IC) card as recited in claim 1, further comprising at least one application stored in the nonvolatile memory and executable on the processor to request access to the one or more data files.

9. An integrated circuit (IC) card as recited in claim 1, embodied as a smart card.

10. An operating system for an integrated circuit (IC) card, comprising:
a file system to manage access to data files stored in both volatile memory and nonvolatile memory in the IC card, at least one of the data files having an associated access control list to enable the file system to control application access to the at least one of the data files, the file system utilizing at least a first allocation table and a second allocation table, the first allocation table being temporary, located in the volatile memory and restricted to referencing data files stored in the volatile memory, and the second allocation table being persistent, located in the nonvolatile memory and restricted to referencing data files stored in the nonvolatile memory; and an application program interface (API) to expose the file system to applications, the API enabling applications to directly access the data files stored in both the volatile memory and the nonvolatile memory.

11. An operating system as recited in claim 10, wherein the API defines a function for opening a data file, the function being used to open data files in the volatile memory and the nonvolatile memory.

12. An operating system as recited in claim 10, wherein the API defines a function, the function including a parameter specifying whether a data file resides in the volatile memory or in the nonvolatile memory.

13. An operating system as recited in claim 10, wherein the file system comprises:

a memory region directory to identify whether individual data files are located in the volatile memory or in the nonvolatile memory, the memory region directory to use one or more memory identifiers to specify a memory region of the one or more data files.

14. An operating system as recited in claim 10, wherein the one or more memory identifiers include RAM, EEPROM and ROM.

* * * * *